L. A. THOMPSON.
CANDY AND METHOD OF PRODUCING.
APPLICATION FILED APR. 7, 1919.
1,391,918.
Patented Sept. 27, 1921.
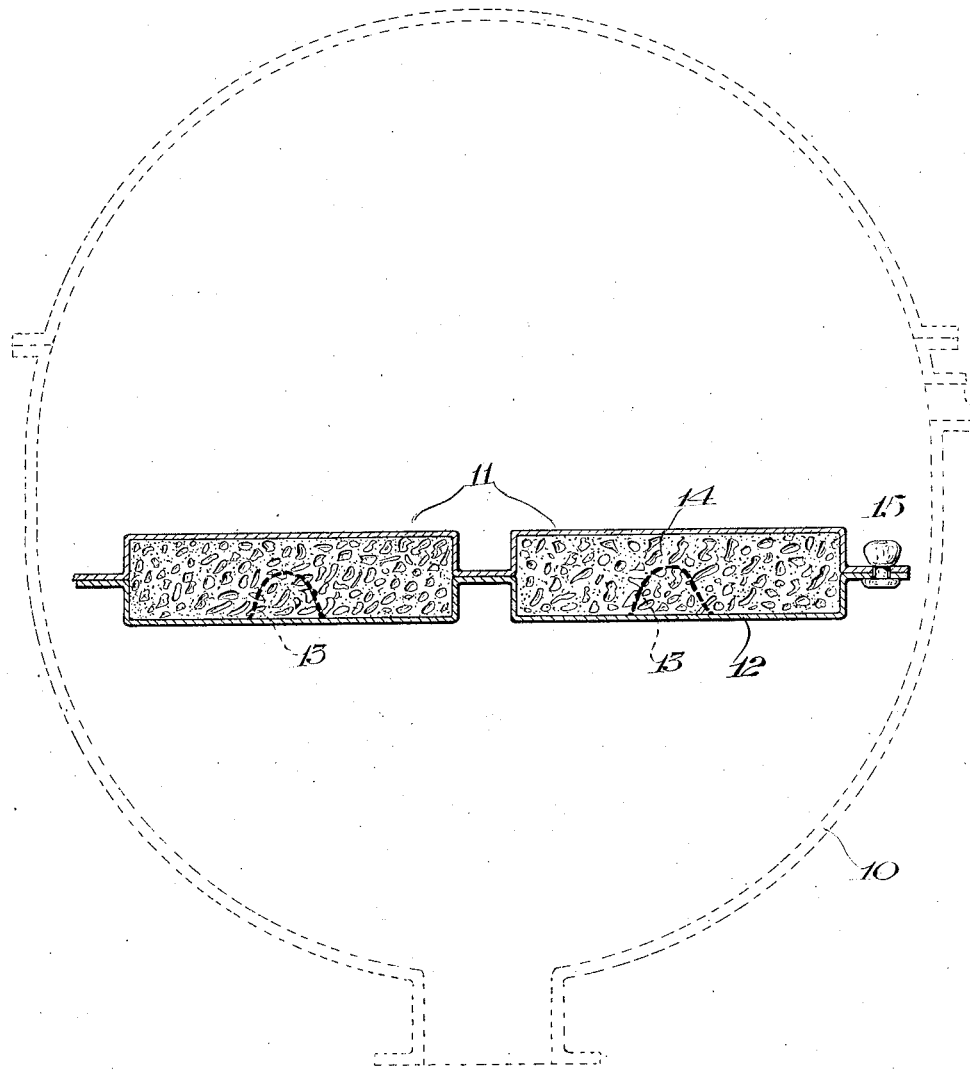
WITNESSES.
INVENTOR
ATTORNEY

UNITED STATES PATENT OFFICE.

LIVINGSTON A. THOMPSON, OF WAUKESHA, WISCONSIN.

CANDY AND METHOD OF PRODUCING.

1,391,918.  Specification of Letters Patent.  Patented Sept. 27, 1921.

Application filed April 7, 1919. Serial No. 288,164.

*To all whom it may concern:*

Be it known that I, LIVINGSTON A. THOMPSON, a citizen of the United States, and resident of Waukesha, in the county of Waukesha and State of Wisconsin, have invented new and useful Improvements in Candies and Methods of Producing, of which the following is a description, reference being had to the accompanying drawings, which are a part of this specification.

This invention has for its object to produce candy in a foraminous state without the introduction of gas forming chemicals.

Heretofore sponge-like candies having numerous cavities or holes, and consequently herein designated as foraminous, have been formed by adding bicarbonate of soda or the like to produce gas bubbles in the mass as it hardens. Such methods have the objection that parts of the gas forming chemical are not dissolved and consequently remain intact as a residue when the candy is dissolved in the mouth, giving an undesirable taste and when in sufficient quantities being probably injurious to the health of the consumer.

The object of the present invention is to expand the bubbles of steam contained in the mass after boiling by subjecting the mass to a high degree of vacuum and thus produce the desirable foraminous state in the product.

Another object of the invention is to accomplish the above expansion while the material is contained within the mold so that the expanded candy will fill the mold and when hardened will have the shape of the mold cavity.

With the above and other objects in view the invention consists in the expanded candy and the method of producing it as herein claimed in all equivalents.

Referring to the accompanying drawing, the figure constitutes a sectional view of a mold suitable for use in producing the candy of the present invention surrounded by a diagrammatic representation of a vacuum pan.

In this drawing 10 indicates a vacuum pan which may be of any type suitable for use in the boiling of candy and 11 indicates on a much larger scale the mold within the vacuum pan wherein the candy is expanded from a small sized mass, indicated by dotted lines within the mold cavity, to a body completely filling the mold cavity.

In producing candy in accordance with this invention the material, whether it is of sugar or molasses stock, or other material such as malted milk, is boiled within the vacuum pan until it is reduced to the desired density approximating the state of dryness or the state in which it will harden when cold. It is then dropped into the numerous cavities of the lower mold section 12. The amount dropped in each mold cavity is only sufficient to occupy one-tenth or one-twentieth of the capacity of the mold cavity as indicated by dotted lines 13. The upper or cover section of the mold 14, which is preferably of the same shape as the lower section, having cavities registering with the cavities of the lower mold section, is then placed on the lower mold section and is clamped thereto by clamps 15 of any suitable construction, and the mold is placed within the vacuum pan and subjected to a high vacuum, approximately 27 to 29 inches. This causes the globules of steam or other gas naturally contained within the candy mass to expand and so inflate the mass as to make it completely fill the mold cavity. The heat in the vacuum pan is controlled to facilitate the operation and then to cause the expanded candy mass to set and the mold is removed and allowed to cool. When the mold sections are separated the candy in the form of bricks or blocks is removed from the cavities thereof resembling in their arrangement the cavities of a biscuit tin. The finished candy may be produced in any shape determined by the shape of the mold in which it is expanded and will be found to have the irregular shaped cavities uniformly distributed throughout so that it is easily masticated because of its large surface area, it is more readily dissolved by the saliva, but its main feature of advantage distinguishing it from other foraminous candy is that it is entirely devoid of undissolved bicarbonate of soda or other gas producing chemical. While I prefer to expand the candy in the molds as described, it is obvious that it need not be so confined during the expanding operation.

What I claim as new and desire to secure by Letters Patent is:

1. A molded foraminous expanded candy devoid of gas producing chemicals.

2. The method of producing expanded foraminous molded candy which consists in placing the boiled candy mass in a mold and subjecting the mold to a high vacuum and allowing the mass to cool.

3. The method of producing molded sponge candy which consists in placing in a mold a quantity of hot boiled candy, less than enough to fill the mold, and expanding the steam bubbles within the candy and thereby expanding the candy to fill the mold by extracting the air from the mold and allowing the candy to cool in such condition.

In testimony whereof, I affix my signature, in presence of two witnesses.

LIVINGSTON A. THOMPSON.

Witnesses:
R. S. C. CALDWELL,
H. D. CHASE.